UNITED STATES PATENT OFFICE.

WILLIAM HATCH, OF TERMINAL ISLAND, CALIFORNIA, ASSIGNOR TO GEORGE MASON AND RICHARD MASON, OF SAN PEDRO, CALIFORNIA.

PROCESS OF PRODUCING POTASH.

1,057,827.  Specification of Letters Patent.  Patented Apr. 1, 1913.

No Drawing.  Application filed July 16, 1912. Serial No. 709,757.

*To all whom it may concern:*

Be it known that I, WILLIAM HATCH, a subject of the King of Great Britain, residing at Terminal Island, in the county of Los Angeles and State of California, have invented new and useful Improvements in Processes of Producing Potash, of which the following is a specification.

This invention relates to a process of making or producing potash.

The object of the invention is to provide a process for rapidly and economically producing potash from practically inexhaustible sources of potash.

In carrying my invention into practice, I take selected sand, preferably sea sand and grind it to a fine powder. I then mix this sand with a small amount of potash lye; e. g. the leachings from the previous operation; to which a small amount of nitric acid is added, in suitable proportions to form a stiff paste or mortar, and mix this with seaweed, which is rich in potash, and which is abundant on the Pacific coast. The mixture is then in this mushy state spread out in long wide shallow troughs and exposed to the air and sunlight, being turned or spread out anew each day until it is quite or nearly dry, and is allowed to ferment for a considerable time, for example several weeks.

When sand is used which has not been covered by the tide, or which does not contain a sufficient amount of sodium chlorid, I add to the solution with which the sand is to be mixed, a suitable amount of common salt. I have found that sea sand yields a larger proportion of potash than other sands, but by adding salt to the latter in about the proportion present in sea sand, substantially the same result may be secured as though sea sand were used. In practice, I preferably employ one part of lye and one part of sea salt to ninety-four parts of sand, but may combine with the sand a greater proportion of lye, as in the proportion of two, three or four to five parts of lye to each ninety-four parts of sand, in order to accelerate the process. In some cases I heat the sand for example to a red heat, or lower, to obtain better and quicker results.

The presence of the small amount of salt, and the ash leachings to which a small amount of nitric acid has been added, greatly accelerates the fermentation and consequently greatly shortens the time necessary for obtaining the potash. Small amounts of salt (sodium chlorid) and potassium nitrate serve as nutrients to the fermentative organisms.

In the process of fermentation of the seaweed and under the oxidizing action of the air, the same is disintegrated and the mass "blossoms," first showing feathery forms which gradually take the shape of cauliflower heads or sections thereof, and eventually form into lumps of various sizes technically called "blooms." Into these lumps more or less of the disintegrated sand is absorbed or merged, the lumps being fully 90% soluble in water.- The crude potash salts thus produced are ground or pulverized and packed for subsequent use and may be used as a fertilizer or may be refined or treated in any of the usual ways for use as potash salts in a purified condition or for the production of other potassium salts.

In preparing the acid-lye solution, I preferably leach a suitable amount of wood ashes with sea-water. As soon as it is strong enough I add to the lye suitable vegetable fermentative matter, such as about 10% of ground seaweed or the juices or extracts therefrom and from 1% to 5% of ordinary commercial nitric acid. This acid will act on the alkalis (sodium and potassium carbonate), and convert them into nitrates. The solution will then usually be alkaline, and should not in any case be more than faintly acid. Too much acid would retard or prevent the fermentation, by destroying the bacteria. Under some conditions I may use sawdust in addition to the seaweed or its juices, with greater efficiency. The lye may also be made from the ashes of seaweeds or the refuse from the seaweed from which the juices are extracted, or the water extract of the "blooms" of a previous operation may be used.

The fermentative action may be increased in producing the potash in the ground or a bed of sand or wherever excessive moisture exists by adding to the mass an additional amount of vegetable matter, such as described. If desired, the sawdust may be first placed in the lye and the ground seaweed or its juices added after the mass has been exposed to air and sunlight a certain time.

The term "seaweed" in the appended claims includes the same as solid or crushed seaweed, or the juices of the same, expressed by pressure or otherwise.

What I claim is:—

1. The process of producing potash salts, which comprises mixing seaweed with finely divided silicious material and a liquid containing some salt of potash, and then allowing the mass to ferment and produce "blooms" or nodules, and separating these "blooms" from the remaining material.

2. The process of producing potash salts, which comprises mixing seaweed with finely divided silicious material and a mixture of leachings of wood ashes and nitric acid, and then allowing the mass to ferment and produce "blooms" or nodules, and separating these "blooms" from the remaining material.

3. The process of producing potash salts, which comprises mixing seaweed with finely divided silicious material and a liquid containing some salt of potash, and then allowing the mass to ferment and produce "blooms" or nodules, and separating these "blooms" from the remaining material, and thereafter purifying the potash salts.

In testimony whereof I affix my signature in presence of two witnesses.

WILLIAM HATCH.

Witnesses:
GEORGE MASON,
RICHARD MASON.